(12) United States Patent
Smith

(10) Patent No.: US 6,361,595 B1
(45) Date of Patent: Mar. 26, 2002

(54) PROCESS FOR THE PREPARATION OF PIGMENT COMPOSITIONS

(75) Inventor: Derek Stewart Hunter Smith, Johnstone (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/545,749

(22) Filed: Apr. 10, 2000

(30) Foreign Application Priority Data

May 5, 1999 (GB) .............................................. 9910251

(51) Int. Cl.$^7$ ........................... C09B 67/20; C09D 11/02
(52) U.S. Cl. ....................... 106/499; 106/493; 106/496; 106/504; 106/505
(58) Field of Search ................................ 106/499, 504, 106/493, 496, 505

(56) References Cited

U.S. PATENT DOCUMENTS

| | | | |
|---|---|---|---|
| 3,959,276 A | 5/1976 | Luloff et al. .............. | 260/248.5 |
| 3,974,136 A | 8/1976 | Hunger et al. .............. | 260/176 |
| 4,457,783 A | 7/1984 | Hamilton et al. ........... | 106/288 |
| 4,515,639 A | 5/1985 | Dopfer et al. .............. | 106/288 |
| 4,957,841 A | 9/1990 | Macholdt et al. ........... | 430/110 |
| 5,137,568 A | 8/1992 | Durham et al. ............. | 106/20 |
| 5,266,110 A | 11/1993 | Rieper et al. .............. | 106/496 |
| 5,282,897 A | 2/1994 | Bugnon et al. ............. | 106/437 |
| 5,663,206 A | 9/1997 | Ajoku et al. ................ | 514/634 |

FOREIGN PATENT DOCUMENTS

| | | |
|---|---|---|
| EP | 0 062 304 | 10/1982 |
| GB | 1116567 | 6/1968 |
| GB | 1 343 606 | 1/1974 |

OTHER PUBLICATIONS

Abst. Sheet for EP 0 062 304 (Oct. 1982).
Patent abstracts of Japan #04215830 (Aug. 1992).
Patent abstracts of Japan #63255220 (Oct. 1988).
Chemical Abstract #301477 XP–002148930 (Sep. 1992).

*Primary Examiner*—Anthony Green
(74) *Attorney, Agent, or Firm*—David R. Crichton

(57) ABSTRACT

Preparation of stabilized pigment compositions, comprising mixing a water-miscible quaternary ammonium compound of formula III

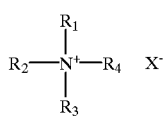

III wherein $R_1$, $R_2$, $R_3$ and $R_4$ independently of each other stand for $C_1$–$C_{22}$aklyl, $C_2$–$C_{22}$alkenyl, benzyl, pyridyl, quinolyl, isoquinolyl or polyoxyalkylenyl, and $X^-$ is an anion, a water-immiscible organic solvent and a pigment.

5 Claims, No Drawings

PROCESS FOR THE PREPARATION OF PIGMENT COMPOSITIONS

The present invention relates to a process for the preparation of pigment compositions. It more particularly relates to such compositions which are stabilised, especially with respect to the two major sources of pigment instability—microbial contamination and loss of colour strength on storage.

All organic matter is decomposable by micro-organisms which use it as their source of energy. According to estimates, microbial decomposition destroys materials to the value of at least one hundred thousand million dollars several times every year. Organic pigments are widely used for the colouration of formulations (such as inks, paints, toiletries etc.), and are themselves known to be carriers of wide-spread microbial contamination. As to aqueous formulations of pigments it is common practice to add chemical biocides in order to prevent microbial spoilage. Examples of such biocides are commercial preparations based individually or in mixtures on the following molecular types:

1,2-Benzisothiazolin-3-one (BIT);
N-butylbenzisothiazolin-3-one;
5-Chloroisothiazolin-3-one (5-CIT);
Methylisothiazolin-3-one (MIT);
N-octylisothiazolin-3-one;
Pentane-1,5-dialdehyde;
1,3,5-Trishydroxyethyltriazine;
Tetrakishydroxymethylphosphonium sulphate.

These biocides are, however, ineffective at preventing microbial contamination of pigments in the dry state.

In addition, many pigments, in particular monoazo pigments, suffer from the serious disadvantage of loss of colour strength on storage. It is known that some pigment powders may undergo apparent crystallographic modification when stored at ambient temperatures (for example, opaque Pigment Yellow 74 powders on storage increase in opacity and result in colouristically weaker paint compositions). There have been a number of attempts to produce in particular, storage-stable Pigment Yellow 74, e.g. U.S. Pat. Nos. 4,457,783 and 5,271,769. Both of these approaches suffer from the problem that they are commercially non-viable due to the high cost of the patented treatments and are difficult to manufacture consistently to achieve the desired stability.

It is thus an object of the present invention to provide a process for the preparation of pigment compositions which are stable with respect to microbial contamination and loss of colour strength, particularly the composition should be simple, reproducible in manufacture, and highly cost-effective.

Accordingly, a process for the preparation of stabilised pigment compositions has been found.

It has been found, too, that water-miscible quaternary ammonium compounds can be used to effectively stabilize pigments with respect to microbial contamination. In addition, it has been found that certain water-immiscible organic solvents stabilize against loss of colour strength on storage. Further, a novel composition, and its use have been found, too.

The inventive process is characterised by mixing a water-miscible quaternary ammonium compound, a water-immiscible organic solvent and a pigment. Preferably, the addition is carried out after the pigment synthesis.

In a preferred embodiment an aqueous slurry of a pigment, for example obtained by re-dispersing (usually according to common methods) a previously formed pigment press-cake (separated from its reaction slurry) in water, is mixed with the water-miscible quaternary ammonium compound and the water-immiscible organic solvent.

In those cases where a pigment is prepared in an aqueous medium, the water-miscible quaternary compound and the water-immiscible organic solvent may be added to the reaction slurry without first separating the pigment from the reaction slurry.

The treated pigment aqueous dispersion is preferably heated to a temperature usually in the range of from 50 to 100° C., particularly from 80 to 100° C. In general, the heat treatment is carried out for 30 to 200 minutes.

The treated pigment can be separated from the aqueous medium by known methods in the art such as filtration. Preferably it is then washed, stored as a press-cake and finally dried.

After drying, pigment powder may be prepared by common grinding processes such as hammer milling, sifter milling or classifier milling. It is also possible to use dryers which give the pigment directly in the powder form.

As pigments all known inorganic or organic pigments can be used, preferred are the following organic pigments: azo-containing pigments, phthalocyanines, quinacridones, indanthrones, flavanthrones, pyranthrones, perylenes, thioindigos, dioxazines, perinones, isoindolines, isoindolinones, diketopyrrolopyrroles, basic dye complexes and metal complexes.

Preferred pigments, especially with regard to stabilization against loss of clour strength, are monoazo pigments, particularly preferred arylamide pigments of formula I

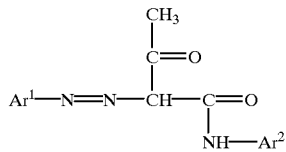

I where $Ar^1$ and $Ar^2$ independently from each other denote an unsubstituted phenyl group or substituted by one or two substituents selected from the group consisting of $C_1$–$C_4$alkyl, such as methyl, ethyl, n-, i-propyl, n-, i-, sec.- or tert.-butyl, preferably methyl, halogen such as fluorine, chlorine, bromine or iodine, preferably chlorine, nitro and $C_1$–$C_4$alkoxy such as methoxy, ethoxy, n-propoxy, i-propoxy, n-butoxy, preferably methoxy, or a pigment of formula II

II where $Ar^3$ denotes a 2-hydroxynaphthyl group which may be further substituted by a carboxylic acid group or by a group —$CONHAr^2$. Such pigments include C.I. Pigment Yellow 1, Yellow 3, Yellow 4, Yellow 5, Yellow 73, Yellow 98, Yellow 111 and especially Yellow 74; C.I. Pigment Red 3 and Red 12 and C.I. Pigment Orange 5.

The water-miscible quaternary ammonium compound may be a compound (or mixture of compounds) of formula III

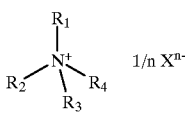

wherein $R_1$, $R_2$, $R_3$ and $R_4$ independently of each other stand for $C_1$–$C_{22}$alkyl, $C_2$–$C_{22}$alkenyl, benzyl, pyridyl, quinolyl, isoquinolyl or polyoxyalkylenyl, and $X^{n-}$ is an anion such as a halide like chloride or bromide, hydroxide, sulphate, hydrogen sulphate, phosphate, hydrogen phosphate, dihydrogen phosphate, nitrate, preferably chloride and hydroxide, most preferably chloride, and n is 1, if the anion is monovalent, 2, if the anion is di-, or 3, if the anion is trivalent.

Preferred as water-miscible quaternary ammonium compounds are those wherein $R_2$ is benzyl. More preferred are compounds wherein $R_2$ is benzyl and $R_1$ and $R_3$ are preferably $C_1$–$C_4$ alkyl, particularly preferred methyl, and $R_4$ is $C_{12}$–$C_{22}$alkyl or $C_{12}$–$C_{22}$alkenyl. Also preferred are those wherein $R_1$, and $R_2$ are 2-hydroxyethyl and $R_3$ is $C_1$–$C_4$ alkyl, especially methyl.

$C_1$–$C_{22}$alkyl stands for e.g. linear or branched $C_1$–$C_{22}$alkyl such as methyl, ethyl, n-, i-propyl, n-, i-, sec.-, tert.-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexydecyl, n-heptadecyl, n-octadecyl, n-nonadecyl, n-eicosyl, n-uneicosyl, n-doeicosyl, preferably for linear or branched $C_{12}$–$C_{22}$alkyl such as n-dodecyl, n-tridecyl, n-tetradecyl, n-pentadecyl, n-hexydecyl, n-heptadecyl, n-octadecyl, n-nonadecyl, n-eicosyl, n-uneicosyl, n-doeicosyl.

$C_2$–$C_{22}$alkenyl stands for e.g. linear or branched $C_2$–$C_{22}$alkenyl such as ethenyl, n-, i-propenyl, n-butenyl, n-pentenyl, n-hexenyl, n-heptenyl, n-octenyl, n-nonenyl, n-decenyl, n-undecenyl, n-dodecenyl, n-tridecenyl, n-tetradecenyl, n-pentadecenyl, n-hexydecenyl, n-heptadecenyl, n-octadecenyl, n-nonadecenyl, n-eicosenyl, n-uneicosenyl, n-doeicosenyl, preferably for linear or branched $C_{12}$–$C_{22}$alkenyl such as n-dodecenyl, n-tridecenyl, n-tetradecenyl, n-pentadecenyl, n-hexydecenyl, n-heptadecenyl, n-octadecenyl, n-nonadecenyl, n-eicosenyl, n-uneicosenyl, n-doeicosenyl.

Particularly preferred as water-miscible quaternary ammonium compounds are those of the formula IV

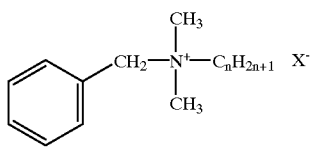

where n is an integer from 12 to 18 and X is an anion, preferably chloride.

In general, the ratio by weight of pigment to water-miscible quaternary ammonium compound is chosen in the range from 50:50 to 99.5:0.5, preferably from 90:10 to 99.5:0.5, particularly preferred from 94:6 to 99:1.

As water-immiscible organic solvents preferably those solvents are chosen which are liquid at room temperature and below a temperature of 100° C. such as for example organic acids like $C_5$–$C_{18}$alkyl carboxylic acids which can be linear or branched, saturated or unsaturated esters of such acids, fatty alcohols which are water-immiscible like hydroxyalkylamines or nitriles.

$C_5$–$C_{18}$alkyl carboxylic acid stands for n-pentyl carboxylic acid, n-hexyl carboxylic acid, n-heptyl carboxylic acid, n-octyl carboxylic acid, 2-ethyl hexyl carboxylic acid, n-nonyl carboxylic acid, n-decyl carboxylic acid (sebaic acid), n-undecyl carboxylic acid, n-dodecyl carboxylic acid, n-tridecyl carboxylic acid, n-tetradecyl carboxylic acid, n-pentadecyl carboxylic acid, n-hexadecyl carboxylic acid, n-heptadecyl carboxylic acid, n-octadecyl carboxylic acid.

Preferred as water-immiscible organic solvents are ethylhexanoic acid, triethanolamineoleate, N—$C_1$–$C_4$alkyldipropylenetriamine, 2,4,7,9-tetramethyl-4,7-dihydroxydec-5,6-yne and n-dibutyl sebacate, particularly preferred 2,4,7,9-tetramethyl-4,7-dihydroxydec-5,6-yne and n-dibutyl sebacate, especially n-dibutyl sebacate.

The ratio by weight of pigment to water-immiscible organic solvent is for example from 90:10 to 99.5:0.5, preferably from 94:6 to 99:1.

Another preferred embodiment of the invention on hand relates to a process for the preparation of stabilised pigment compositions comprising pigments of the formula

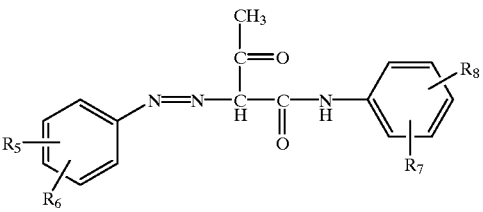

wherein
$R_5$, $R_6$, $R_7$ and $R_8$ independently of each other are hydrogen, $C_1$–$C_4$alkyl, $C_1$–$C_4$alkoxy, halogen or nitro, which process comprises
a) diazotising an amine of formula VI

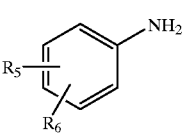

and coupling onto a coupling component of formula VII

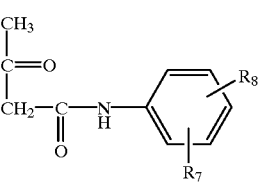

b) treating the reaction mixture at elevated temperature in presence of at least one water-immiscible organic solvent which is liquid below said treating temperature, and in presence of at least one water-miscible quaternary ammonium compound of the formula III and
c) separating the reaction product.

Preferred alkyl groups for $R_5$, $R_6$, $R_7$ and $R_8$ are methyl and ethyl, especially methyl.

Preferred alkoxy groups for $R_5$, $R_6$, $R_7$ and $R_8$ are methoxy and ethoxy, especially methoxy.

$R_5$, $R_6$, $R_7$ and $R_8$ as halogen are preferably chlorine.

$R_5$, $R_6$, $R_7$ and $R_8$ are preferably independently of each other hydrogen, methyl, methoxy, chlorine or nitro, particularly hydrogen, methoxy or nitro.

Particularly preferred are those pigments of formula V wherein $R_5$ is nitro, $R_6$ and $R_7$ are methoxy, and $R_8$ is hydrogen.

A particularly preferred pigment is

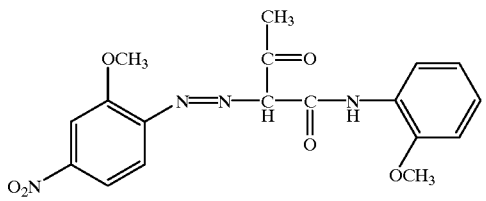

The diazotisation of the amine of formula VI and the coupling onto the coupling component of formula VII can be carried out according to known methods. Diazotisation usually is carried out in aqueous medium, at low pH (for example 1 to 4) and at a temperature in the range of from −5 to 10° C., in presence of a nitrite. Coupling, for example, can be carried out in aqueous medium, at a pH of 4 to 7 and a temperature in the range of usually from 0 to 40° C.

The water-immiscible organic solvent and the water-miscible quaternary ammonium compound are preferably added after step a). Usually the reaction product is not separated from the reaction slurry directly after diazotisation and coupling. This means that the water-immiscible organic solvent and/or the water-miscible quaternary ammonium compound are preferably added in step b) to the reaction slurry containing the reaction product.

Of most interest is a process, wherein step b) is carried out in the presence of dibutyl sebacate and in the presence of a water-miscible quaternary ammonium compound of the formula IV, wherein n is an integer from 12 to 18 and X⁻ is chloride.

The temperature of the heat treatment according to step b) is preferably 50 to 100° C., especially 80 to 100° C. Usually the heat treatment is carried out for 30 to 200 minutes. For the preparation of powder it is preferred to carry out the heat treatment for about 30 to 90 minutes, whereas for the preparation of beads a time of 90 to 200 minutes is preferred.

The separation according to step c) usually is carried out by filtration.

If desired, beads can be obtained directly after drying. As given before, for the beads it is preferred to carry out the heat treatment for a longer time period. The present invention is further directed to pigment compositions, preferably in powder or bead form, comprising at least one pigment of formula V and a water-miscible quaternary ammonium compound of the formula III. As to these compositions the preferences given before apply.

Another object of the present invention is the use of at least one water-immiscible organic solvent which is liquid below a temperature of 100° C. (under ambient pressure), and at least one water-miscible quaternary ammonium compound of the formula III for the preparation of pigment compositions, preferably in powder or bead form, stabilised with respect to loss of colour strength, which compositions contain at least one pigment of the formula I. Here the same preferences apply as given before.

A further object of the present invention is the use of a water-miscible quaternary ammonium compound of the formula III, for the preparation of pigment compositions, preferably in powder or bead form, stabilised with respect to microbial contamination, which compositions contain at least one pigment of the formula I. Here the same preferences apply as given before.

The pigment compositions mentioned before are preferably in powder form.

The pigment compositions can be obtained according to the process of the present invention. They can also be obtained by dispersing the relevant pigment in aqueous medium according to common methods and then treating the dispersion in analogy to the abovementioned steps b) and c) of a preferred process of the present invention.

The pigment compositions of the process of the present invention are distinguished by their stability to microbial contamination. In addition, by use of a water-immiscible organic solvent, compositions stable with respect to loss of colour strength are obtained.

The use of the water-miscible quaternary ammonium compounds of formula 1 results in compositions which are stable with respect to microbial contamination. The use of the water-immiscible organic solvent results in compositions which are stable with respect to loss of colour strength. The compositions can be used for the pigmentation of surface coating compositions such as paints or printing inks. They are particularly useful for the pigmentation of aqueous surface coatings such as emulsion paints. In the following examples which further illustrate the present invention, all parts and proportions shown are by weight unless otherwise stated.

EXAMPLES

Susceptibility to microbial contamination is assessed according to the following procedure:

Microbial contamination is assessed using individual bacteria of the morphological types, Gram-positive cocci, Gram-negative cocci, Gram-positive rods and Gram-negative rods which are maintained on Nutrient Agar slopes. When required, each is cultured in Nutrient broth at 30° C. until an organism count of >$10^8$ colony-forming units (cfu) per milliliter (ml) is reached. The individual cultures are then mixed in equal proportions to provide a mixed culture which is then used immediately.

Abbreviations in biocide tables:

| | |
|---|---|
| KLC | Benzyldimethyl-$C_{12-14}$-alkylammonium chloride (mixture with different alkyl groups having from 12 to 14 carbon atoms) |
| THPS | Tetrakishydroxymethylphosphonium sulphate |
| LV | 1,2-Benzisothiazolin-3-one |
| OTW | n-Octylisothiazolin-3-one |
| MIT | Methylisothiazolin-3-one |
| DN | n-Butylbenzisothiazolin-3-one |
| DMHTB | Benzyldimethyl-$C_{16-18}$-alkylammonium chloride |
| M2HTB | Methylbenzyl-di-$C_{16-18}$-alkylammonium chloride |
| 2C-75 | Dimethyl-di-$C_{12-14}$-alkylammonium chloride |
| C35 | Trimethyl-di-$C_{12-14}$-alkylammonium chloride |
| EthO-12 | Methylbis-(2-hydroxyethyl)-$C_{12-14}$-alkylammonium chloride |

Example 1

(PY74)

23.3 parts of acetic acid (80%) are added to a solution of 55 parts of acetoacet-o-anisidide dissolved in a solution of 25.5 parts of sodium hydroxide (47%) in 450 parts of water at a temperature of 0° C. The resultant slurry is reacted with 42.5 parts of p-nitro-o-anisidine previously diazotised with 45.4 parts of sodium nitrite (37%) and 56 parts of hydrochloric acid (36%) in the usual manner with simultaneous addition of sodium hydroxide solution (10%) to maintain pH 5.5–6.0. To the coupled slurry are then added 3 parts of dibutyl sebacate and 1 part of dimethylbenzyl-$C_{12-14}$alkylammonium chloride (100% active) and the mixture is heated to a temperature of 100° C. and maintained at this temperature for one hour. The product is then filtered and washed with water under vacuum to remove soluble salts. The filter cake(still under vacuum suction) is mixed with a bacterial culture (10 ml of culture diluted to 100 ml with water)and vacuum suction is maintained until no further liquid emanates from the filter cake. The filter cake, without further washing, is then dried and converted to a powder by grinding. The powder is then passed through a 150 micron sieve.

The procedure described in Example 1 is repeated, but varying the type of biocide and amount of biocide used. The procedure for determining the extent of microbial contamination is as follows:

10 mg of the sieved powder and one drop of sterile water are evenly spread on a Nutrient Agar plate with a glass spreader under aseptic conditions and the plate incubated at 30° C. for 48 hours, The number of bacterial colonies evident on each plate are then counted and expressed as the number of colony-forming units per gram (cfu/g).

The results of microbial contamination analysis are given in Table 1.

TABLE 1

| parts | KLC | THPS | DN | OTW | LV | MIT |
|---|---|---|---|---|---|---|
| 0 | $6.0 \times 10^3$ | $>10^5$ | $>10^5$ | $4.1 \times 10^4$ | $>10^5$ | $1.0 \times 10^4$ |
| 0.1 | $>10^4$ | | | | | |
| 0.5 | 0 | $>10^5$ | $>10^4$ | $>10^4$ | $>10^5$ | $8.0 \times 10^3$ |
| 1.0 | 0 | $>10^5$ | $>10^4$ | $2.0 \times 10^4$ | $>10^5$ | $1.0 \times 10^4$ |
| 3.0 | 0 | $>10^5$ | $>10^3$ | $>10^4$ | $>10^5$ | $3.0 \times 10^3$ |
| 5.0 | 0 | $>10^5$ | 0 | $1.4 \times 10^3$ | $>10^5$ | $1.0 \times 10^4$ |

The procedure described in Example 1 is repeated, but varying the quaternary ammonium compound and amount of quaternary ammonium compound used. The results of microbial contamination analysis are given in Table 2:

TABLE 2

| parts KLC | DMHTB | M2HTB | 2C-75 | C-35 | EthO-12 |
|---|---|---|---|---|---|
| 0 $6.0 \times 10^3$ | $>10^4$ | $>10^4$ | $>10^4$ | $>10^4$ | $>10^4$ |
| 0.5 0 | $>10^4$ | $>10^4$ | $8.0 \times 10^4$ | $>10^4$ | $>10^4$ |
| 1.0 0 | 0 | 0 | 0 | $4.5 \times 10^3$ | 0 |
| 3.0 0 | 0 | 0 | 0 | 0 | 0 |
| 5.0 0 | 0 | 0 | 0 | 0 | 0 |

The procedure described in Example 1 is repeated, but varying the amount of DBS used. The results of microbial contamination analysis are given in Table 3:

TABLE 3

| 0 parts DBS + 1 part KLC | 0 cfu/g |
|---|---|
| 1 parts DBS + 1 part KLC | 0 cfu/g |
| 2 parts DBS + 1 part KLC | 0 cfu/g |
| 3 parts DBS + 1 part KLC | 0 cfu/g |

Example 2

(PY65)

23.3 parts of acetic acid (100%) are added to a solution of 55 parts of acetoacet-o-anisidide dissolved in a solution of 25.5 parts of sodium hydroxide (47%) in 450 parts of water at a temperature of 0° C. The resultant slurry is reacted with 42.5 parts of o-nitro-p-anisidine previously diazotised with 45.4 parts of sodium nitrite (37%) and 56 parts of hydrochloric acid (36%) in the usual manner with simultaneous addition of sodium hydroxide solution (10%) to maintain pH 5.5–6.0. To the coupled slurry are then added 3 parts of dibutyl sebacate and 1 part of dimethylbenzyl-$C_{12-14}$alkylammonium chloride (100% active) and the mixture is heated to a temperature of 100° C. and maintained at this temperature for one hour. The product is then filtered and washed with water under vacuum to remove soluble salts. The filter cake (still under vacuum suction) is mixed with a bacterial culture (10 ml of culture diluted to 100 ml with water) and vacuum suction is maintained until no further liquid emanates from the filter cake. The filter cake, without further washing, is then dried and converted to a powder by grinding. The powder is then passed through a 150 micron sieve.

The procedure described in Example 2 is repeated, but varying the type of biocide and amount of biocide used. The results of microbial contamination analysis are given in Table 4:

TABLE 4

| parts | KLC | THPS | DN | OTW | LV | MIT |
|---|---|---|---|---|---|---|
| 0 | $>10^4$ | $>10^5$ | $>10^4$ | $>10^4$ | $>10^4$ | $>10^4$ |
| 0.5 | $2.7 \times 10^3$ | $>10^5$ | $>10^4$ | $>10^4$ | $>10^4$ | $>10^4$ |
| 1.0 | 0 | $>10^5$ | $>10^4$ | $>10^4$ | $>10^4$ | $>10^3$ |
| 3.0 | 0 | $>10^5$ | $>10^4$ | $>10^4$ | $>10^4$ | $>10^3$ |
| 5.0 | 0 | $>10^5$ | $8.0 \times 10^2$ | 0 | $>10^4$ | 0 |

The procedure described in Example 2 is repeated, but varying the type of biocide and amount of biocide used and omitting the DBS. The results of microbial contamination analysis are given in Table 5:

TABLE 5

| parts | KLC | THPS | OTW | LV | MIT |
|---|---|---|---|---|---|
| 0 | $6.0 \times 10^4$ | $>10^5$ | $>10^4$ | $>10^4$ | $>10^5$ |
| 0.5 | $1.3 \times 10^4$ | $>10^5$ | $>10^4$ | $>10^4$ | $>10^5$ |
| 1.0 | 0 | $>10^5$ | $>10^4$ | $>10^4$ | $>10^5$ |
| 3.0 | 0 | $>10^5$ | $>10^3$ | $>10^4$ | $>10^5$ |
| 5.0 | 0 | $>10^5$ | $>10^3$ | $>10^4$ | $>10^5$ |

Example 3

(PY74)

Example 1 is repeated except that after the product is filtered and washed with water to remove soluble salts. The filter cake is dried and converted to a powder by grinding.

Example 4

(PY74)

23.3 parts of acetic acid (80%) are added to a solution of 55 parts of acetoacet-o-anisidide dissolved in a solution of 25.5 parts of sodium hydroxide (47%) in 450 parts of water at a temperature of 0° C. The resultant slurry is reacted with 42.5 parts of p-nitro-o-anisidine previously diazotised with 45.4 parts of sodium nitrite (37%) and 56 parts of hydrochloric acid (36%) in the usual manner with simultaneous addition of sodium hydroxide solution (10%) to maintain pH 5.5–6.0. To the coupled slurry are then added 3 parts of dibutyl sebacate and the mixture is heated to a temperature of 100° C. and maintained at this temperature for one hour. The product is then filtered and washed with water under vacuum to remove soluble salts. The filter cake is dried and converted to a powder by grinding.

The dried pigments are incorporated in a conventional manner into an alkyd paint system (SORBAL®P470, an alkyd resin ex DSM resins Ltd. having a solids content of 70%, white spirit, pigment and driers solution).

|  | MILLBASE | FINAL PAINT |
|---|---|---|
| PIGMENTATION | 20% | 10% |
| PIGMENT/BINDER | 1/1.4 | 1/4.7 |
| SOLIDS CONTENT | 35% | 54% |

The dried powders are each divided into two portions. One portion is tested in the paint system immediately after drying. The other portion is stored at ambient temperature for one month before the paint is prepared. The tinting strengths are assessed visually and instrumentally.

The results are given in Table 6. The values correspond to the instrumentally-measured colour strength for the same pigment content in the paint.

TABLE 6

| Example/Pigment | amount of Pigment required | | | | loss of strength |
|---|---|---|---|---|---|
|  | Initial | 3 weeks | 6 weeks | 8 weeks |  |
| C.I. Pigment Yellow 74 | 141 | 105 | 105 |  | 36 |
| (control) | 134 |  | 108 |  | 26 |
|  | 146 | 104 |  |  | 42 |
| ex. 3 | 93 | 90 |  | 93 | 0 |
| ex. 4 | 104 | 103 | 103 | 101 | 3 |

Example 5

(PYI 3)

A solution of 8.9 parts of acetic acid (100%) and 15 parts hydrochloric acid (36%) in 100 parts water are added to a solution of 63 parts of acetoacet-m-xylidide dissolved in a solution of 25.2 parts of sodium hydroxide (50%) in 676 parts of water at a temperature of 20° C. The resultant slurry is reacted with 36.9 parts of a previously tetrazotised solution of 3,3'-dichlorobenzidine, with simultaneous addition of sodium hydroxide solution (10%) to maintain pH 4.5–5.5. To the coupled slurry is then added 3 parts of dimethylbenzyl-$C_{12-14}$alkylammonium chloride (100% active) and the mixture is heated to a temperature of 93° C. and maintained at this temperature for 5 minutes. The product is then filtered and washed with water under vacuum to remove soluble salts. The filter cake (still under vacuum suction) is mixed with a bacterial culture (10 ml of culture diluted to 100 ml with water) and vacuum suction is maintained until no further liquid emanates from the filter cake. The filter cake, without further washing, is then dried and converted to a powder by grinding. The powder is then passed through a 150 micron sieve. The results are given in Table 7.

TABLE 7

| parts | KLC | THPS | OTW | LV | MIT |
|---|---|---|---|---|---|
| 0 | >$10^4$ | >$10^4$ | >$10^4$ | >$10^4$ | >$10^4$ |
| 0.5 | >$10^4$ | >$10^4$ | >$10^4$ | $3.0 \times 10^3$ | >$10^4$ |
| 1.0 | >$10^4$ | >$10^4$ | $5.0 \times 10^3$ | $4.0 \times 10^2$ | $4.0 \times 10^3$ |
| 3.0 | 0 | >$10^4$ | 0 | $1.0 \times 10^2$ | $1.010^3$ |
| 5.0 | 0 | >$10^4$ | 0 | $6.0 \times 10^2$ | $9.0 \times 10^2$ |

What is claimed is:

1. A process for the preparation of stabilised pigment compositions, which comprises mixing a water-miscible quaternary ammonium compound of formula III

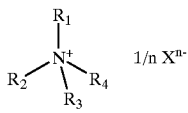

III wherein $R_1$, $R_2$, $R_3$ and $R_4$ independently of each other stand for $C_1$–$C_{22}$alkyl, $C_2$–$C_{22}$alkenyl, benzyl, pyridyl, quinolyl, isoquinolyl or polyoxyalkylenyl, $X^{n-}$ is an anion, and n is 1, if the anion is monovalent, 2, if the anion is di-, or 3, if the anion is trivalent, and a water-immiscible organic solvent and a pigment, wherein the ratio by weight of pigment to water-miscible quaternary ammonium compound is from 50:50 to 99.5:0.5, and wherein the ratio by weight of pigment to water-immiscible organic solvent is from 90:10 to 99.5:0.5.

2. The process according to claim 1 wherein an aqueous dispersion of a pigment is mixed with the water-miscible quaternary ammonium compound and the water-immiscible organic solvent.

3. A process for the preparation of stabilised pigment compositions, comprising pigments of the formula V

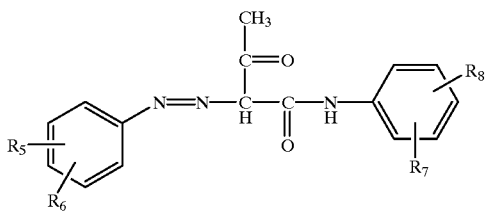

V wherein $R_5$, $R_6$, $R_7$ and $R_8$ independently of each other are hydrogen, $C_1$–$C_4$alkyl, $C_1$–$C_4$alkoxy, halogen or nitro, which process comprises a) diazotising an amine of formula VI

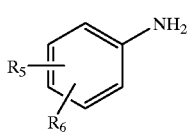

VI and coupling onto a coupling component of formula VII

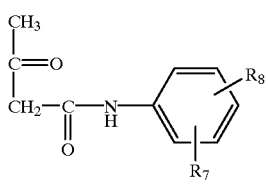

VII to produce a reaction mixture;

b) treating the reaction mixture at an elevated temperature in presence of at least one water-immiscible organic solvent which is liquid below said elevated temperature, and in presence of at least one water-miscible quaternary ammonium compound of formula III

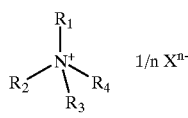

III wherein $R_1$, $R_2$, $R_3$ and $R_4$ independently of each other stand for $C_1$–$C_{22}$alkyl, $C_2$–$C_{22}$alkenyl, benzyl, pyridyl, quinolyl, isoquinolyl or polyoxyalkylenyl, $X^{n-}$ is an anion, and n is 1, if the anion is monovalent, 2, if the anion is di-, or 3, if the anion is trivalent, to produce a final reaction product, and c) separating the final reaction product and optionally converting the product to a powder or bead.

4. A composition comprising at least one pigment of formula I

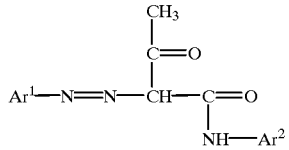

I where $Ar^1$ and $Ar^2$ denote independently from each other an unsubstituted phenyl group or substituted by one or two substituents selected from the group consisting of $C_1$–$C_4$alkyl, halogen, nitro and $C_1$–$C_4$alkoxy, or a pigment of formula II

II where $Ar^3$ denotes a 2-hydroxynaphthyl group which may be further substituted by a carboxylic acid group or by a group —$CONHAr^2$ and at least one water-miscible quaternary ammonium compound of the formula III

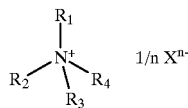

III wherein $R_1$, $R_2$, $R_3$ and $R_4$ independently of each other stand for $C_1$–$C_{22}$alkyl, $C_2$–$C_{22}$alkenyl, benzyl, pyridyl, quinolyl, isoquinolyl or polyoxyalkylenyl, $X^{n-}$ is an anion, and n is 1, if the anion is monovalent, 2, if the anion is di-, or 3, if the anion is trivalent, and a water-immiscible organic solvent and a pigment, wherein the ratio by weight of pigment to water-miscible quaternary ammonium compound is from 50:50 to 99.5:0.5.

5. A composition according to claim 4 which additionally comprises a water-immiscible organic solvent, wherein the ratio by weight of pigment to water-immiscible organic solvent is from 90:10 to 99.5:0.5.

* * * * *